United States Patent [19]

Bertone

[11] 4,343,520
[45] Aug. 10, 1982

[54] ROLLING BEARING
[75] Inventor: Enrico Bertone, Turin, Italy
[73] Assignee: RIV-SKF Officine di Villar Perosa S.p.A., Turin, Italy
[21] Appl. No.: 189,569
[22] Filed: Sep. 23, 1980
[30] Foreign Application Priority Data
    Sep. 21, 1979 [IT] Italy ............... 53582/79[U]
[51] Int. Cl.³ ............................................. F16C 19/18
[52] U.S. Cl. ............................. 308/178; 308/189 R; 308/233
[58] Field of Search ........... 308/30, 178, 189 R, 308/193, 195, 196, 219, 230, 232, 233, 236

[56] References Cited
U.S. PATENT DOCUMENTS

| 1,186,712 | 6/1916 | Vandegrift | 308/178 |
| 1,250,620 | 12/1917 | Moysey | 308/178 |
| 1,590,181 | 6/1926 | Brunner | 308/236 |
| 1,759,640 | 5/1930 | Brunner et al. | 308/189 R |
| 1,793,124 | 2/1931 | O'Conner | 308/233 |
| 3,871,724 | 3/1975 | Brandenstein et al. | 308/195 |
| 3,940,194 | 2/1976 | Asberg | 308/188 |

FOREIGN PATENT DOCUMENTS

| 41114 | 9/1909 | Austria | 308/189 R |
| 57790 | 12/1923 | Sweden | 308/189 R |
| 151576 | 9/1955 | Sweden | 308/189 R |

Primary Examiner—Richard R. Stearns
Attorney, Agent, or Firm—Gifford, VanOphem, Sheridan and Sprinkle

[57] ABSTRACT

A rolling bearing comprising an outer race and an inner race having interposed therebetween two or more rows of rolling bodies, is described. The most important characteristic of such bearing consists in that the inner race is arranged to support a cantilever shaft, and to this end the said race is formed substantially by two facing disks having interposed therebetween a spacer disk.

10 Claims, 2 Drawing Figures

ROLLING BEARING

BACKGROUND OF THE INVENTION

The present invention relates to a rolling bearing.

As is known, the conventional rolling bearings are rigidly connected in their outer race to a seating and in their inner race to a shaft, usually by shrinking.

For this reason they require a high surface finish on the surfaces of the races which are coupled to the shaft and the seating, as well as on the surfaces of the shaft and the seating, so as to obtain a correct mounting interference necessary for a good behavior of the bearing during the normal use.

Moreover, if these bearings are used for supporting a cantilevered shaft, usually it is necessary to use at least two of them on the shaft in order to ensure a directional guide of this latter, a single bearing mounting by shrinking between races and shaft and seating being ill-suited, even in the case of bearings with two or more rows of rolling bodies, to ensure the said directional guide, even if the overhang is not long. Thus, it is clear that the high surface finish and the necessary use of two bearings for supporting a cantilevered shaft give rise to quite high costs, especially when no very high coupling precision is required, as is often the case of many industrial apparatus, such as ventilators, or household apparatus, such as for example washing machines.

SUMMARY OF THE INVENTION

It is an object of the present invention to provide a rolling bearing which will allow to avoid the high surface finish of all the coupling surfaces between a shaft, a bearing and a seating, and will ensure the necessary directional guide for a shaft supported in a cantilevered fashion, thus reducing both the manufacturing costs and the overall dimensions required for supporting the shaft in cantilevered fashion.

The present invention provides such a rolling bearing, characterized by comprising an outer race and an inner race having disposed therebetween two or more rows of rolling bodies, the said inner race being arranged to support a cantilevered shaft.

BRIEF DESCRIPTION OF THE DRAWINGS

For a better understanding of the present invention, a particular embodiment of the invention will now be described by way of non-limiting example, with reference to the accompanying drawings, in which.

DETAILED DESCRIPTION OF A PREFERRED EMBODIMENT OF THE PRESENT INVENTION

Figure 1:
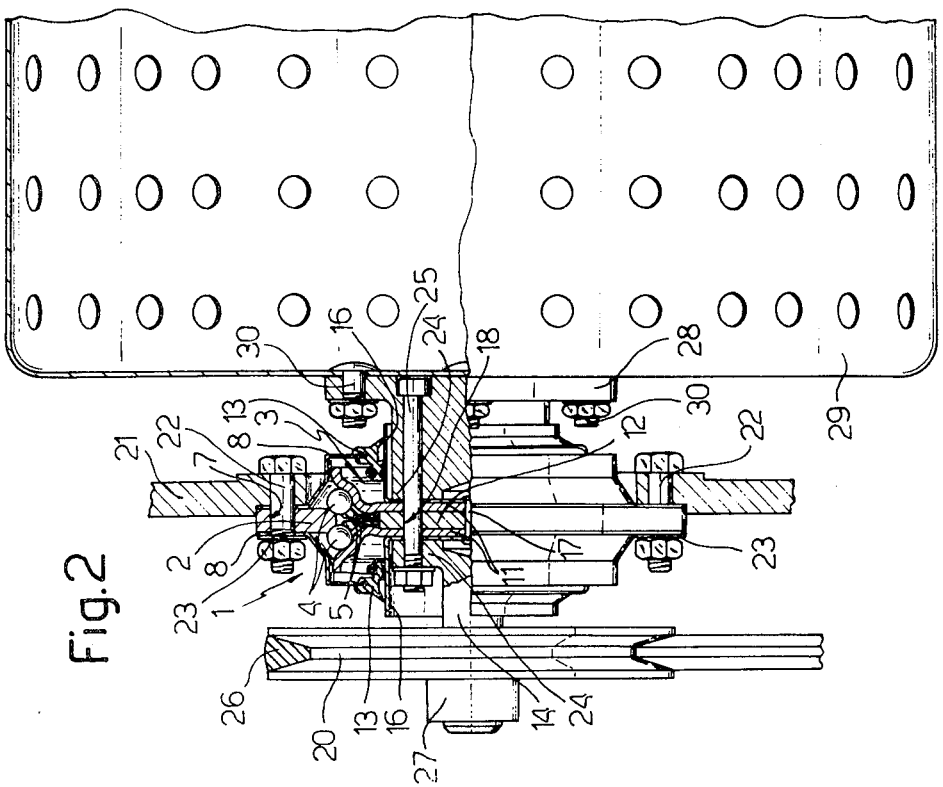
FIG. 1 is a longitudinal sectional view of a bearing constructed according to the teachings of the present invention.

Referring now to FIG. 1, reference numeral 1 indicates generally a bearing constructed according to the teachings of the present invention, which bearing comprises an outer race 2 and an inner race 3, between which there are disposed two rows 4 of balls supported by a cage 5 formed by two halves.

Outer race 2 has a rectangular cross-section and is provided on its inner edges with two grooves 6 in which the balls of the row 4 slide; this race is provided, towards the outside, with a row 7 of holes which acts as an attachment flange and two covers 8 made of plate, which also are provided with perforations corresponding to the row 7 of holes.

Figure 2:
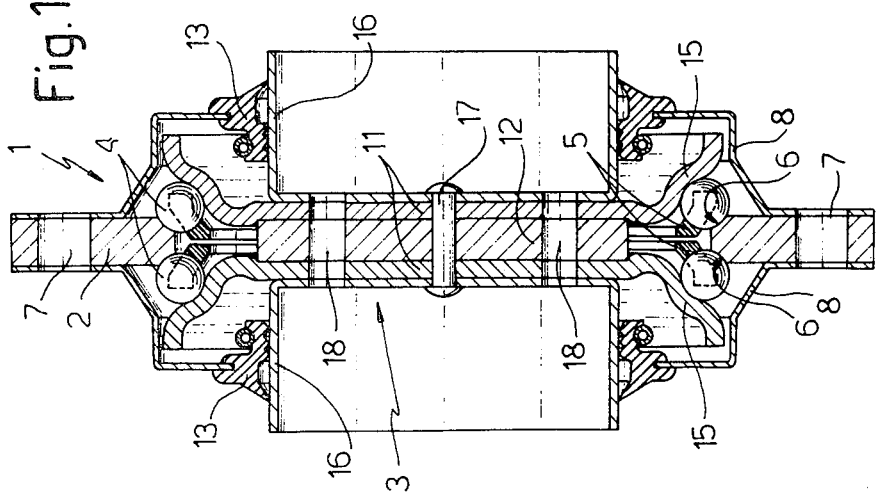
FIG. 2 is a reduced scale view of the bearing shown in FIG. 1, in an example of application.

Inner race 3 is formed substantially by a disk made of five parts, of which the first two, symmetrically shaped, indicated by reference numeral 11, form rest surfaces for the two rows 4 of balls, a second part 12 acts as spacer between the two parts 11, and two third lateral parts 16, form rest surfaces for two sealing rings 13 and at the same time centering surfaces for a two-piece shaft indicated by reference numeral 14 in FIG. 2.

The two first parts 11 of the race 3 are formed by two symmetrical disks, inclined sideways at their outer annular ends 15 and defining together a substantially V-shaped section on which the two rows 4 of balls rest, and joined with one another with the interposition of the second part 12 which in its turn is formed by a disk of smaller diameter, centered between and coaxial with the two first parts 11.

The two third parts 16 are substantially two symmetrical cylindrical bottoms having a horizontal axis, which are coaxially fixed to the two first parts 11 of the inner race 3.

The inner race 3 made of five parts which, as said before, are all coaxial, is assembled by means of a rivet 17 disposed as an axis; this race 3 is provided with a coaxial row of holes through all the five parts and allows the mounting on the two-piece shaft 14, as shown in FIG. 2.

In FIG. 2 the bearing 1 of the present invention is fixed by the outer race 2 to a frame 21 provided with a centering projection, by means of a row of bolts 22 which have lock washers 23 and are introduced into the row of holes 7 of outer race 2. The inner race 3 of the bearing 1 is connected to the two-piece shaft 14, each piece being provided with flanges 24. Each flange 24 is centered on an inner side surface of the bottoms 16 and is joined with the other flange 24 and the interposed race 3 by means of row of through bolts 25.

On the left-hand half of the shaft 14 there is keyed, in a known manner, a pulley 20 which cooperates with a "V" belt 26 and is set by a ring nut 27. Fixed in the right-hand half of the shaft 14 by means of a flange 28 and by means of a row 30 of bolts is a user 29 which in particular is formed by a basket of a washing machine.

The assembly and the operation of the bearing 1 according to the present invention are as follows.

The assembly is carried out by riveting the rivet 17 in such a manner as to join together the five parts of the inner race 3, after having positioned the two rows 4 of balls, the two-piece cage and the outer race 2.

The covers 8 and the sealing rings 13 may be positioned later.

The operation of the bearing, after having fixed the outer race 2 and the covers 8 of the bearing 1 to the frame 21 by means of the row of bolts 22, and the inner race 3 to the flanges 24 of the two halves of the shaft 14 by means of the row 25 of bolts, is that of a normal rolling bearing.

The bearing according to the present invention, which is arranged to support a cantilevered shaft and whose manufacturing cost is reduced, corresponds to the objects of the invention and is suitable for being applied, by simple assembly operations, to industrial apparatus for light duties, such as electric ventilators, and in particular to apparatuses for household applications, at the same time allowing to considerably reduce the overall dimensions.

Finally, it is clear that the described and illustrated embodiment of the bearing 1 provided in accordance with the teachings of the present invention is susceptible of modifications and variations without departing from the scope of the invention.

In particular, instead of the two rows 4 of balls it is possible to use two rows of rolling bodies of a different configuration, such as for example tapered rolling bodies.

The part 12 which serves as a spacer may also be omitted or, instead of being disposed between the two parts 11, it may be disposed laterally with respect to one of them, thus having the function of strengthening the structure.

I claim:

1. A rolling bearing comprising an outer race, an inner race, two or more rows of rolling bodies disposed intermediate said outer race and said inner race, and wherein said inner race comprises means for supporting a cantilevered shaft, said means comprising the inner race being formed by first and second disks.

2. A rolling bearing as defined in claim 1 comprising a spacer disk disposed between said first and second disks.

3. A bearing as claimed in claim 1 comprising means for connecting a motor shaft to one side of said inner race, and for connecting a user shaft to the opposite side of the inner race.

4. A bearing as claimed in claim 3, characterized in that the said user is a basket of a washing machine.

5. A bearing as claimed in claim 1, characterized in that the said disks have race surfaces for the said rolling bodies.

6. A bearing as claimed in claim 1, characterized in that the said first and second disks include inclined upper portions extending in opposed directions and define together a V-shaped section.

7. A bearing as claimed in claim 1,
    characterized in that the said outer race is provided with contact surfaces for the said rolling bodies.

8. A bearing as claimed in claim 7, characterized in that the said contact surfaces of the said outer race are formed in grooves located in radially inner edges of the said outer race.

9. A bearing as claimed in claim 1,
    characterized in that the said inner race carries two cylindrical bottoms.

10. A bearing as claimed in claim 1,
    characterized in that the said outer race includes an annular flange portion.

* * * * *